(12) United States Patent　　(10) Patent No.: US 12,216,967 B2
Bobe　　(45) Date of Patent: Feb. 4, 2025

(54) REAL-TIME SIMULATION OF THE OPERATION OF A SPECIFIC ELECTRIC MOTOR

(71) Applicant: dSPACE digital signal processing and control engineering GmbH, Paderborn (DE)

(72) Inventor: Bjoern Bobe, Paderborn (DE)

(73) Assignee: dSPACE GMBH, Paderborn (DE)

( * ) Notice: Subject to any disclaimer, the term of this patent is extended or adjusted under 35 U.S.C. 154(b) by 917 days.

(21) Appl. No.: 17/239,068

(22) Filed: Apr. 23, 2021

(65) Prior Publication Data

US 2021/0334436 A1　Oct. 28, 2021

(30) Foreign Application Priority Data

Apr. 23, 2020　(DE) ..................... 10 2020 111 044.8

(51) Int. Cl.
　*G06F 30/20*　　(2020.01)
　*H03K 19/173*　　(2006.01)
　*G06F 111/10*　　(2020.01)

(52) U.S. Cl.
　CPC ........... *G06F 30/20* (2020.01); *H03K 19/173* (2013.01); *G06F 2111/10* (2020.01)

(58) Field of Classification Search
　CPC .... G06F 30/20; G06F 2111/10; H03K 19/173
　See application file for complete search history.

(56) References Cited

U.S. PATENT DOCUMENTS

2017/0364615 A1* 12/2017 Sanchez Rocha ...... G06F 30/20
2019/0370420 A1* 12/2019 Feng ....................... G06F 30/20
2020/0186069 A1*  6/2020 Moule ..................... H02P 21/14

OTHER PUBLICATIONS

Panzer H, Mohring J, Eid R, Lohmann B. Parametric model order reduction by matrix interpolation. (Year: 2010).*

* cited by examiner

*Primary Examiner* — Chuen-Meei Gan
(74) *Attorney, Agent, or Firm* — Muncy, Geissler, Olds & Lowe, P.C.

(57) ABSTRACT

A computer-implemented method for real-time simulation of the operation of a specific electric motor by a simulator arithmetic unit comprising a programmable logic device on which a generic motor model is implemented. The method includes: providing a generic system of equations corresponding to the generic motor model; receiving specific information corresponding to the specific motor to be simulated for the generic system of equations and inputting this information into the generic system of equations; generating a specific library containing at least some of the arithmetic operations required for the matrix operations for calculating the operation of the specific motor; implementing references in the generic motor model to the arithmetic operations of the specific library required for real-time simulation of the operation of the specific electric motor; and simulating the operation of the specific electric motor by running the generic motor model on the simulator arithmetic unit.

13 Claims, 5 Drawing Sheets

REAL-TIME SIMULATION OF THE OPERATION OF A SPECIFIC ELECTRIC MOTOR

This nonprovisional application claims priority under 35 U.S.C. § 119(a) to German Patent Application No. 10 2020 111 044.8, which was filed in Germany on Apr. 23, 2020 and which is herein incorporated by reference.

BACKGROUND OF THE INVENTION

Field of the Invention

The present invention relates to a computer-implemented method for real-time simulation of the operation of a specific electric motor by means of a simulator arithmetic unit comprising a programmable logic device (FPGAs—field-programmable gate array).

Description of the Background Art

Known from the prior art is, for example, the library "XSG Electric Components Library" (XSG EC Lib) originating from the applicant, which provides system models for FPGA-based simulation of electrical components. Electrical motor control applications that require high precision and sampling rates are typically simulated on a programmable logic device. To maintain identical processes during controller development and testing, the XSG Electric Component Models (closed-loop simulation components) are implemented as XSG (Xilinx® System Generator) models running on a dSPACE DS5203 (PHS systems) or DS6602 (for SCALEXIO) FPGA board, for example. Closed-loop simulation of electrical devices and their controls is typically performed at very high sampling rates in real time. The XSG Electric Component Library can be complemented by I/O functions from the XSG Utils Library on the DS5203/DS6602 FPGA boards, e.g., for time analysis and acquisition of digital input sources. The XSG Electric Component Library and the DS5203/DS6602 FPGA Boards can be used together to simulate electric motors at both the signal and power levels. This provides a system that is highly accurate and stable, allows for very high oversampling rates corresponding to the PWM switching frequency, does not require PWM synchronization, and can be modified by the user.

However, the individual motor models in the library do not cover all boundary conditions and are therefore subject to certain limitations. Up to now, existing motor models therefore had to be laboriously adapted and implemented on programmable logic devices in order to cover the required boundary conditions. In individual cases, it was therefore sometimes very difficult, for example, to represent motors with more than three phases or represent electrical fault simulation.

SUMMARY OF THE INVENTION

It is therefore an object of the present invention to provide a method, with which motor models with which many required boundary conditions can be covered, can be generated with little time expenditure.

This object is achieved by the subject-matter of claim 1. Preferred further developments can be found in the dependent claims.

According to the invention, a computer-implemented method is thus provided for real-time simulation of the operation of a specific electric motor by means of a simulator arithmetic unit comprising a programmable logic device on which a generic motor model is implemented which is the same in terms of its structure for all types of specific electric motors, comprising the following method steps:

Providing a generic system of equations corresponding to the generic motor model, which is the same in terms of its structure for all types of specific electric motors, Receiving specific information corresponding to the specific motor to be simulated for the generic system of equations and inputting this information into the generic system of equations so that the generic system of equations becomes a specific system of equations, which describes the operation of the specific motor and enables the calculation of the operation of the specific motor at a predetermined sampling rate using matrix operations, Generating a specific library containing at least some of the arithmetic operations required for the matrix operations for calculating the operation of the specific motor, Implementing references in the generic motor model to the arithmetic operations of the specific library required for real-time simulation of the operation of the specific electric motor; and Simulating the operation of the specific electric motor by running the generic motor model on the simulator arithmetic unit using the arithmetic operations contained in the specific library referenced in the generic motor model.

The solution according to the invention, which is based on an automated method for model generation with a dynamic library, offers the advantage that a wide variety of topologies, e.g., electric motors or inverters with up to twelve phases and different winding interconnections, can be implemented quickly on an FPGA, regardless of whether they, for example, are separately or permanently excited, or represent synchronous and asynchronous machines or other motor types.

The real-time simulation of the operation of the specific electric motor can be designed in different ways. According to a preferred further development of the invention, the real-time simulation comprises real-time simulation of the operation of only individual components of the specific motor, the operation of the entire specific motor, the operation of motor leads of the specific motor, and/or the operation of an inverter of the specific motor.

The creation of the specific system of equations can also be carried out in various ways. According to a preferred further development of the invention, however, a graphical user interface (GUI) is displayed to a user of the method for this purpose. Such a graphical user interface can considerably facilitate the input of the specific system of equations. In particular, the user can also be offered only those inputs that make technical sense or are free of contradictions. Furthermore, it is advantageous if, in order to provide the generic system of equations corresponding to the generic motor model, arithmetic operations describing the generic system of equations are written in a scripting language.

Further above it has already been expressed that the specific library shall contain at least some of the arithmetic operations required for the matrix operations for the calculation of the operation of the specific motor. Preferably, however, it is provided that when the specific library is generated, all arithmetic operations required for the matrix operations are stored in the specific library. In this way, the specific library can be used for all arithmetic operations, which further reduces the programming effort for simulating the specific motor.

The generic system of equations may be provided with a larger matrix dimension than is required for the specific system of equations describing the specific electric motor. In such a case, it is preferred that for simulating the operation of the specific electric motor, the matrix dimension of the generic system of equations is reduced to the matrix dimension required for the specific system of equations. This has the advantage of saving resources on the programmable logic device.

The invention does not only allow for the simulation of a single specific electric motor. Rather, a preferred further development of the invention provides that, additionally, the operation of another specific electric motor is carried out by means of the simulator arithmetic unit comprising the programmable logic device, on which the generic motor model is implemented, which is the same in terms of its structure for all types of specific electric motors. For this purpose, the method has the following additional method steps:

Receiving specific information corresponding to the further specific motor to be simulated for the generic system of equations and inputting this information into the generic system of equations so that the generic system of equations becomes a specific system of equations, which describes the operation of the further specific motor and enables the calculation of the operation of the further specific motor at a predetermined sampling rate using matrix operations, Generating a further specific library containing at least some of the arithmetic operations required for the matrix operations for calculating the operation of the further specific motor, Implementing references in the generic motor model to the arithmetic operations of the further specific library required for real-time simulation of the operation of the further specific electric motor; and Simulating the operation of the further specific electric motor by executing the generic motor model on the simulator arithmetic unit using the arithmetic operations contained in the further specific library referenced in the generic motor model.

In particular, it is the case that not only a second specific electric motor can be simulated in this way, but of course also more than two specific electric motors, in principle as many as the computing power of the programmable logic device allows. Preferably, the simulation of the operation of the specific electric motor and the simulation of the operation of the further specific electric motor(s) is carried out in parallel or alternately and, for this purpose, switching is carried out between the respective specific libraries assigned to the respective specific motors. This offers the advantage that a switch between different motor variants or fault simulation variants can be implemented in a time-optimized manner.

Finally, the invention also relates to a simulation system comprising at least one real-time capable simulator arithmetic unit and an arithmetic unit for controlling the real-time capable simulator arithmetic unit, wherein the simulation system is configured for executing the method steps of the above-mentioned methods.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

The following detailed description of preferred embodiments of the invention shall be preceded by the following basic explanations:

DETAILED DESCRIPTION

The model on which the simulation is based is described in a generic system of equations according to the preferred embodiment of the invention described herein. The arithmetic operations required for this are contained in a textual description. When a simulation project is created, the system of equations is parameterized for the specific case of relevant boundary conditions, namely by means of those that are given by the specific electric motor to be simulated. According to the preferred embodiment of the invention described herein, a dynamic library of blocks containing the necessary arithmetic operations (basic arithmetic operations, matrix multiplication, coordinate transformation) is then automatically generated from the parameterized textual description. The actual motor model is available on a programmable logic device as a fixed structure of references to library elements, i.e., the arithmetic operations stored in the library. With the generation of the library these references become active, and the simulation of the motor model can be executed. It is irrelevant for the structure of the motor model on the FPGA which motor configuration the motor model is based on.

Depending on the motor to be simulated, this configuration may differ in the given motor topology, i.e., the number of motor phases, number of winding systems (e.g., stator/rotor), and in the faults to be simulated or the coordinate system of the simulating motor. However, no structural changes need to be made in the motor model implemented on the programmable logic device. The different configurations are only reflected in different parameters.

Figure 1:
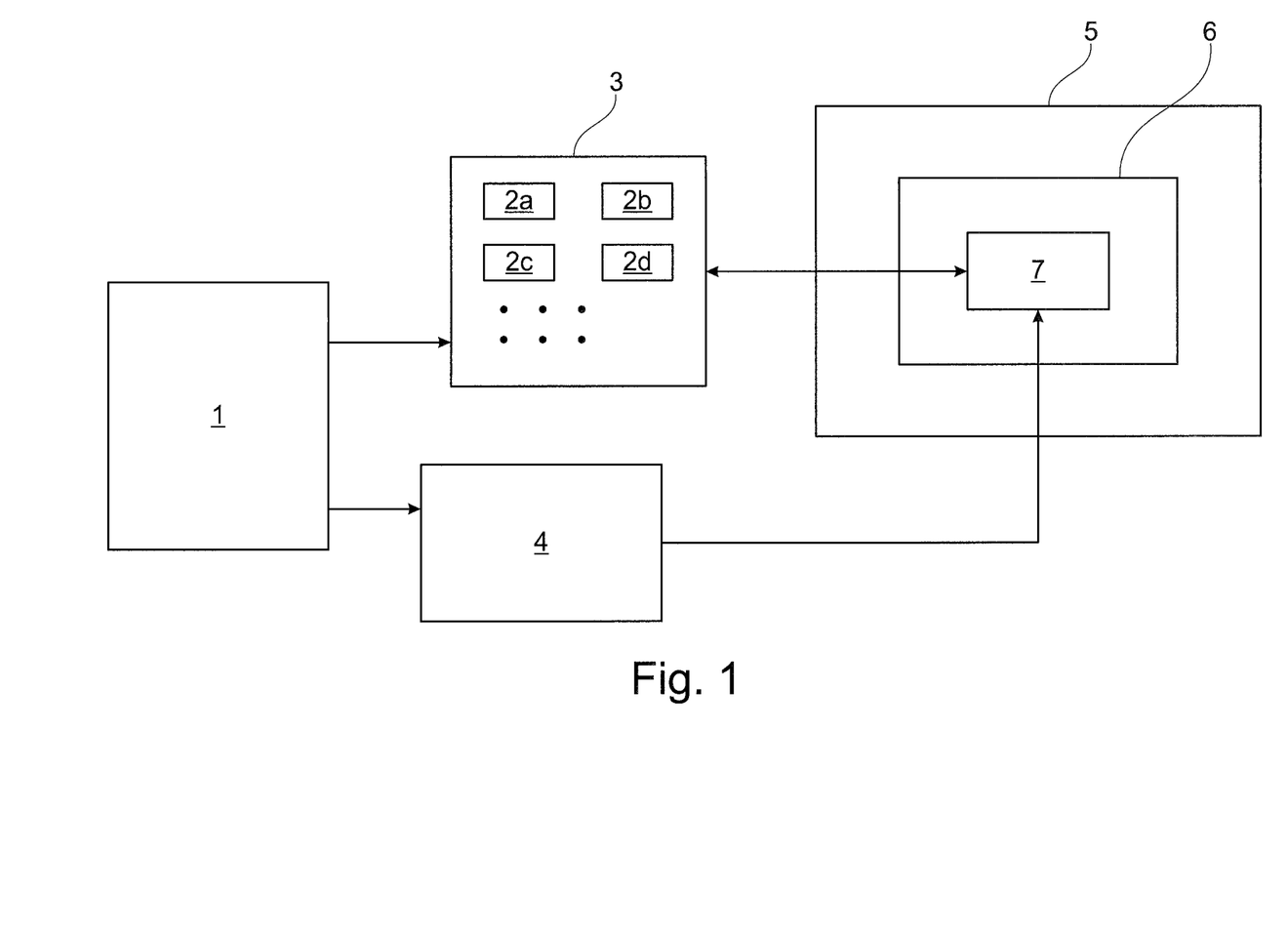
FIG. 1 shows, schematically, a system according to a first preferred embodiment of the invention.

In detail:

FIG. 1 schematically shows a system according to a preferred embodiment of the invention, which has a textual description 1 that is written, for example, in a scripting language. Said description has the same structure for each motor model to be implemented. The description then differs only in different parameters and, if necessary, matrix dimensions. Based on this textual description 1, a specific library 3 for implementation on the programmable logic device 6 is automatically created, which contains the arithmetic operations 2a, 2b, 2c, 2d, . . . for the motor model to be implemented. In the next step, this specific library 3 is linked in the programmable logic device 6 so that an executable motor model is available on the programmable logic device 6.

For this purpose, a simulator arithmetic unit 5 comprising the programmable logic device 6 is provided, on which a generic motor model 7 is implemented. This generic motor model 7 is designed in such a way that its structure is the same for all types of specific electric motors. Such a way of describing electric motors is basically known and requires for the description of a specific electric motor the supplementation of the generic model 7 with parameters of the specific electric motor regarding its structure, the number of phases, etc. This supplementation of the generic model 7 with parameters of the specific electric motor is stored by means of the specific information 4 about the specific electric motor.

Figure 2:
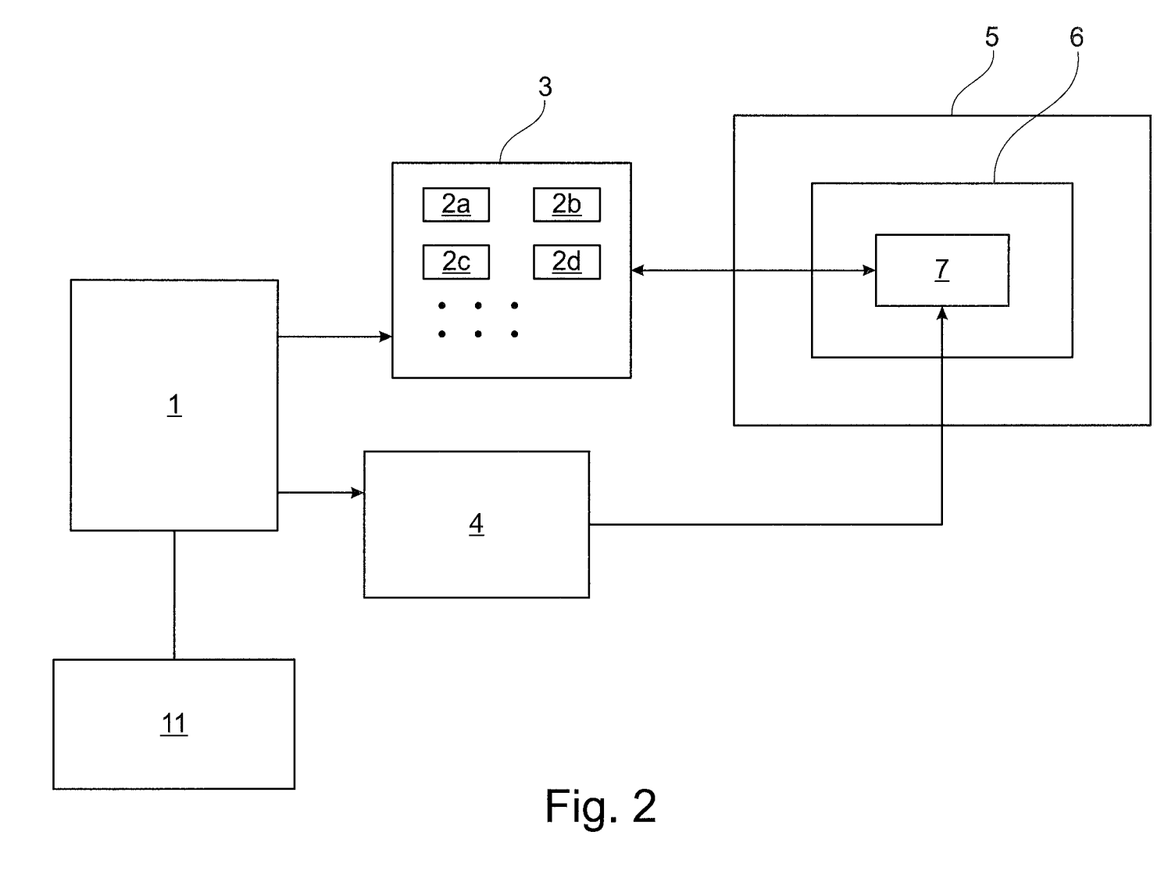
FIG. 2 shows, schematically, a system according to a second preferred embodiment of the invention.

The system schematically shown in FIG. 2 according to a second preferred embodiment of the invention corresponds to the system of FIG. 1 with the supplement that a user interface 11 is additionally provided by means of which the user can enter data for the textual description 1. This facilitates the operation of the system and may serve to reduce errors in the data input of the textual description 1.

Figure 3:
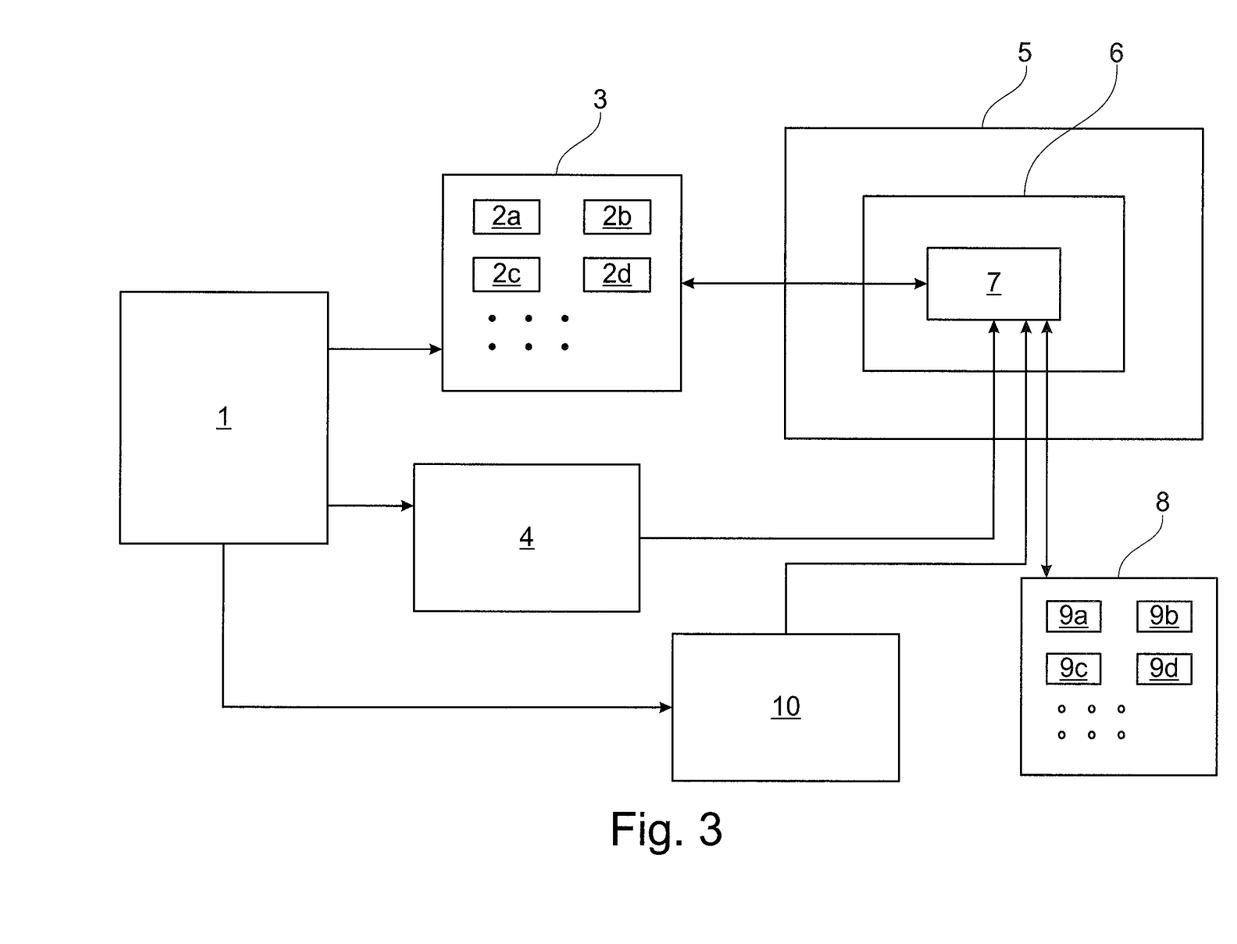
FIG. 3 shows, schematically, a system according to a third preferred embodiment of the invention.

A system according to a third preferred embodiment of the invention is schematically shown in FIG. 3. The system there is able to simulate not only one but two different specific electric motors. For this purpose, a further specific library 8 with arithmetic operations 9a, 9b, 9c, . . . as well as further specific information for the second motor is provided. In all other respects, the structure of this system corresponds to the structure of the system shown in FIG. 1.

Figure 4:
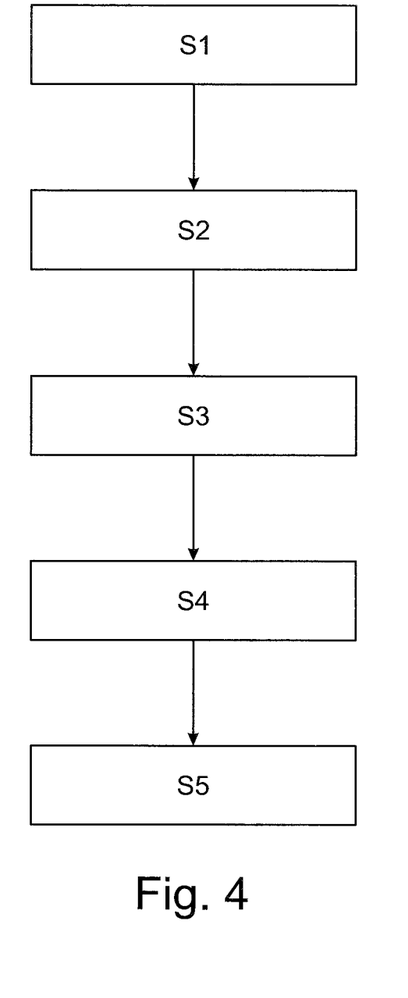
FIG. 4 shows a sequence of a method according to the first preferred embodiment of the invention.

FIG. 4 then shows a flowchart of a computer-implemented method for real-time simulation of the operation of a specific electric motor according to the first preferred embodiment of the invention. This method can thus be implemented on the system shown in FIG. 1. The method shown in FIG. 4 comprises the following method steps:

Step S1: Providing a generic system of equations corresponding to the generic motor model 7, which is the same in terms of its structure for all types of specific electric motors.

Step S2: Receiving specific information 4 corresponding to the specific motor to be simulated for the generic system of equations and inputting this information into the generic system of equations so that the generic system of equations becomes a specific system of equations, which describes the operation of the specific motor and enables the calculation of the operation of the specific motor at a predetermined sampling rate using matrix operations.

Step S3: Generating a specific library 3 containing at least some of the arithmetic operations required for the matrix operations for calculating the operation of the specific motor.

Step S4: Implementing references in the generic motor model 7 to the arithmetic operations 2a, 2b, 2c, 2d, . . . of the specific library 3 required for real-time simulation of the operation of the specific electric motor.

Step S5: Simulating the operation of the specific electric motor by executing the generic motor model 7 on the simulator arithmetic unit 5 using the arithmetic operations 2a, 2b, 2c, 2d, . . . included in the specific library 3, which are referenced in the generic motor model 7.

Figure 5:
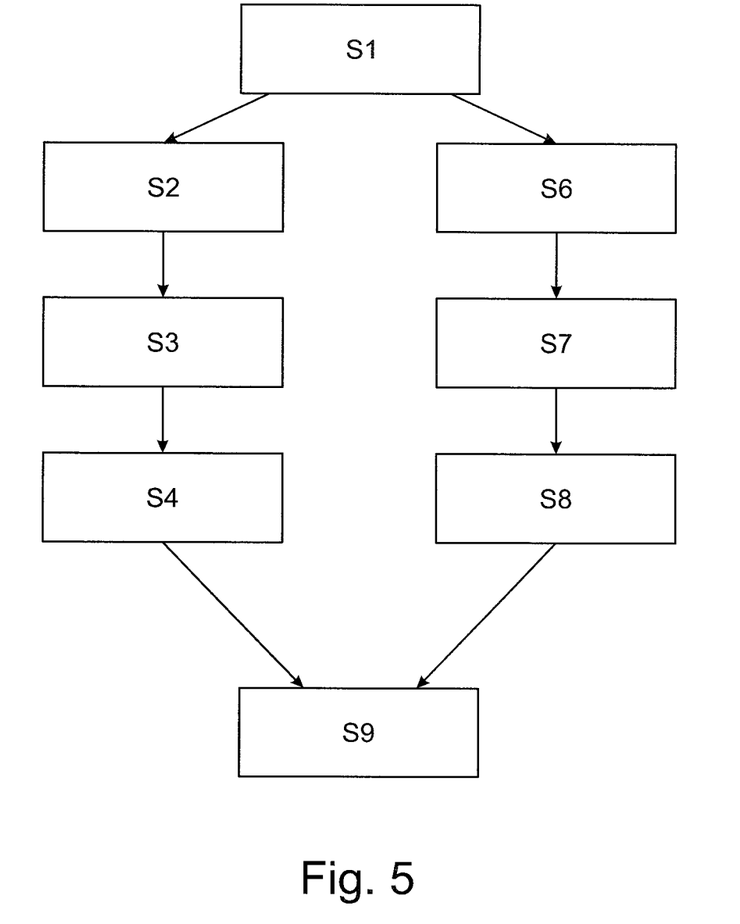
FIG. 5 shows a sequence of a method according to the third preferred embodiment of the invention.

Finally, FIG. 5 shows a flowchart of a computer-implemented method for real-time simulation of the operation of a specific electric motor and another specific electric motor according to the third preferred embodiment of the invention. This method can thus be implemented on the system shown in FIG. 3. The method shown in FIG. 5 comprises, in addition to the above steps S1 to S5 for the first specific electric motor to be simulated, the following method steps:

Step S6: Receiving further specific information 10 corresponding to the further specific motor to be simulated for the generic system of equations and inputting this information into the generic system of equations so that the generic system of equations becomes a specific system of equations, which describes the operation of the further specific motor and enables the calculation of the operation of the specific motor at a predetermined sampling rate using matrix operations.

Step S7: Generating a further specific library 8 containing at least some of the arithmetic operations required for the matrix operations for calculating the operation of the further specific motor.

Step S8: Implementing references in the generic motor model 7 to the arithmetic operations 9a, 9b, 9c, 9d, . . . of the further specific library 8 required for real-time simulation of the operation of the further specific electric motor.

Step S9: Simulating the operation of the specific electric motor by executing the generic motor model 7 on the simulator arithmetic unit 5 using the arithmetic operations 2a, 2b, 2c, 2d, . . . included in the specific library 3 and referred to in the generic motor model 7, and simulating the operation of the further specific electric motor by executing the generic motor model 7 on the simulator arithmetic unit 5 using the arithmetic operations 9a, 9b, 9c, 9d, . . . included in the further specific library 8. and referenced in the generic motor model 7, switching back and forth between the specific library 3 and the further specific library 8 for simulating the operation of the specific electric motor on the one hand and for simulating the operation of the further specific electric motor on the other hand.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for real-time simulation of the operation of a specific electric motor by means of a simulator arithmetic unit comprising a programmable logic device on which a generic motor model is implemented the method comprising:

providing a generic system of equations corresponding to the generic motor model, which is the same in terms of its structure for all types of specific electric motors;

receiving specific information corresponding to the specific motor to be simulated for the generic system of equations and inputting this information into the generic system of equations so that the generic system of equations becomes a specific system of equations, which describes the operation of the specific motor and enables the calculation of the operation of the specific motor at a predetermined sampling rate using matrix operations;

generating a specific library, for implementation on the programmable logic device, containing at least some of the arithmetic operations required for the matrix operations for calculating the operation of the specific motor;

implementing references in the generic motor model, in the programmable logic device, to the arithmetic operations of the specific library required for real-time simulation of the operation of the specific electric motor, and simulating the operation of the specific electric motor by running the generic motor model on the programmable logic device using the arithmetic operations contained in the specific library referenced in the generic motor model, wherein the generic model is structurally the same for all types of specific electric motors, and wherein the generic system of equations is provided with a larger matrix dimension than is required for the specific system of equations describing the specific electric motor and, for simulating the operation of the specific electric motor, the matrix dimension of the generic system of equations is reduced to the matrix dimension required for the specific system of equations to reduce a usage of resources on the programmable logic device.

2. The method according to claim 1, wherein the real-time simulation of the operation of the specific electric motor comprises real-time simulation of the operation of only individual components of the specific motor, the operation of the entire specific motor, the operation of motor leads of the specific motor, and/or the operation of an inverter of the specific motor.

3. The method according to claim 1, wherein for generating the specific system of equations, a graphical user interface is displayed to a user of the method.

4. The method according to claim 1, wherein for providing the generic system of equations corresponding to the generic motor model, arithmetic operations describing the generic system of equations are written in a scripting language.

5. The method according to claim 1, wherein when the specific library is generated, all arithmetic operations required for the matrix operations are stored in the specific library.

6. The method according to claim 1, wherein in addition the operation of a further specific electric motor is carried out by means of the simulator arithmetic unit comprising the programmable logic device on which the generic motor model is implemented, which motor is the same in terms of its structure for all types of specific electric motors, comprising the following additional method steps:

receiving specific information corresponding to the further specific motor to be simulated for the generic system of equations and inputting this information into the generic system of equations so that the generic system of equations becomes a specific system of equations, which describes the operation of the further specific motor and enables the calculation of the operation of the further specific motor at a predetermined sampling rate using matrix operations;

generating a further specific library containing at least some of the arithmetic operations required for the matrix operations for calculating the operation of the further specific motor;

implementing references in the generic motor model to the arithmetic operations of the further specific library required for real-time simulation of the operation of the further specific electric motor; and simulating the operation of the further specific electric motor by running the generic motor model on the programmable logic device using the arithmetic operations contained in the further specific library referenced in the generic motor model.

7. The method according to claim 6, wherein the simulation of the operation of the specific electric motor and the simulation of the operation of the further specific electric motor are performed in parallel or alternately, switching between the specific library and the further specific library for this purpose.

8. A simulation system comprising:
at least one real-time capable simulator arithmetic unit; and
a programmable logic device for controlling the real-time capable simulator arithmetic unit,
wherein the simulation system is configured to perform the method steps of claim 1.

9. The method according to claim 1, wherein the specific library is a dynamic library.

10. The method according to claim 1, wherein the real-time simulation is capable of being conducted for:
operation of only individual components of the specific motor;
operation of an entirety of the specific motor;
operation of motor leads of the specific motor; and
operations of an inverter of the specific motor.

11. A computer-implemented method for real-time simulation of the operation of a specific electric motor by means of a simulator arithmetic unit comprising a programmable logic device on which a generic motor model is implemented which is structurally the same for all types of specific electric motors, the method comprising:

providing a generic system of equations corresponding to the generic motor model, which is the same in terms of its structure for all types of specific electric motors;

receiving specific information corresponding to the specific motor to be simulated for the generic system of equations and inputting this information into the generic system of equations so that the generic system of equations becomes a specific system of equations, which describes the operation of the specific motor and enables the calculation of the operation of the specific motor at a predetermined sampling rate using matrix operations;

generating a specific library, for implementation on the programmable logic device, containing at least some of the arithmetic operations required for the matrix operations for calculating the operation of the specific motor;

implementing references in the generic motor model, in the programmable logic device, to the arithmetic operations of the specific library required for real-time simulation of the operation of the specific electric motor; and simulating the operation of the specific electric motor by running the generic motor model on the programmable logic device using the arithmetic operations contained in the specific library referenced in the generic motor model, wherein, when generating the specific library, all arithmetic operations required for the matrix operations are stored in the specific library, and wherein the generic system of equations is provided with a larger matrix dimension than is required for the specific system of equations describing the specific electric motor, and for simulating the operation of the specific electric motor, the matrix dimension of the generic system of equations is reduced to the matrix dimension that is required for the specific system of equations to reduce a usage of resources on the programmable logic device.

12. The method according to claim 11, wherein in addition a further specific electric motor is operated by means of the simulator arithmetic unit comprising the programmable logic device on which the generic motor model is implemented, which is the same in terms of its structure for all types of specific electric motors, comprising the following additional method steps:

receiving specific information corresponding to the further specific motor to be simulated for the generic system of equations and inputting this information into the generic system of equations so that the generic system of equations becomes a specific system of equations, which describes the operation of the further specific motor and enables the calculation of the operation of the further specific motor at a predetermined sampling rate using matrix operations;

generating a further specific library containing at least some of the arithmetic operations required for the matrix operations for calculating the operation of the further specific motor;

implementing references in the generic motor model to the arithmetic operations of the further specific library required for real-time simulation of the operation of the further specific electric motor; and simulating the operation of the further specific electric motor by running the generic motor model on the programmable logic device using the arithmetic operations contained in the further specific library referenced in the generic motor model.

13. The method according to claim 12, wherein the simulation of the operation of the specific electric motor and the simulation of the operation of the further specific electric motor are performed in parallel or alternately, switching between the specific library and the further specific library for this purpose.

* * * * *